N. AUBIN.
Making Oil and Water Gas.
No. 14,045.  Patented Jan. 8, 1856.
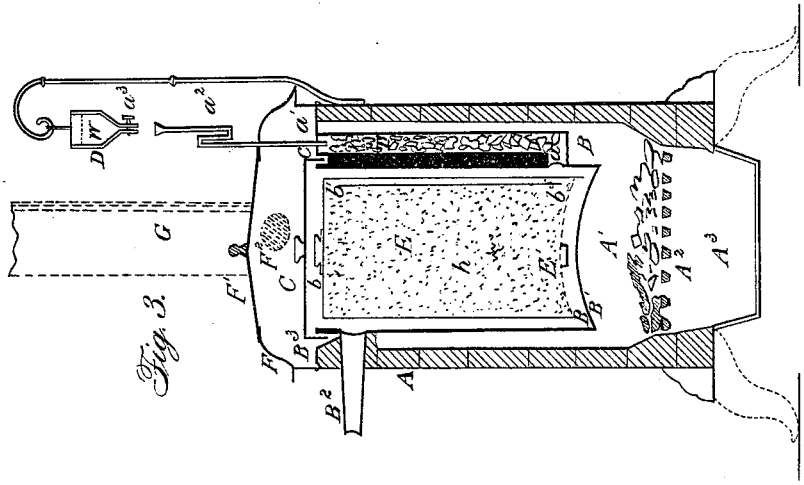
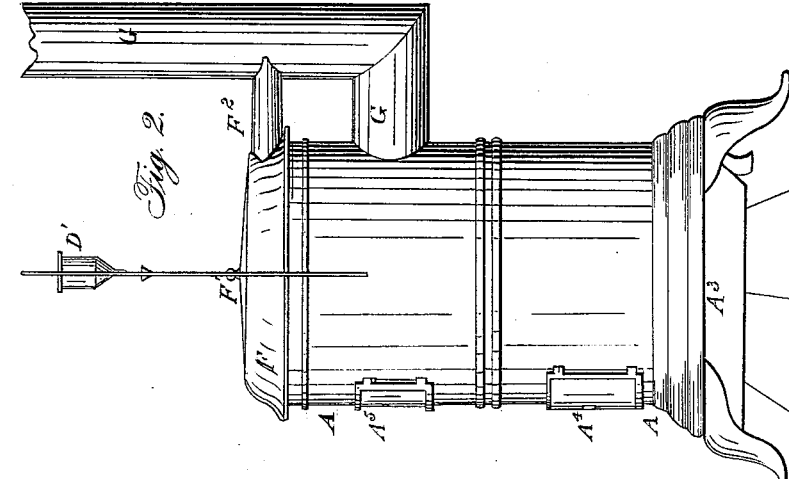
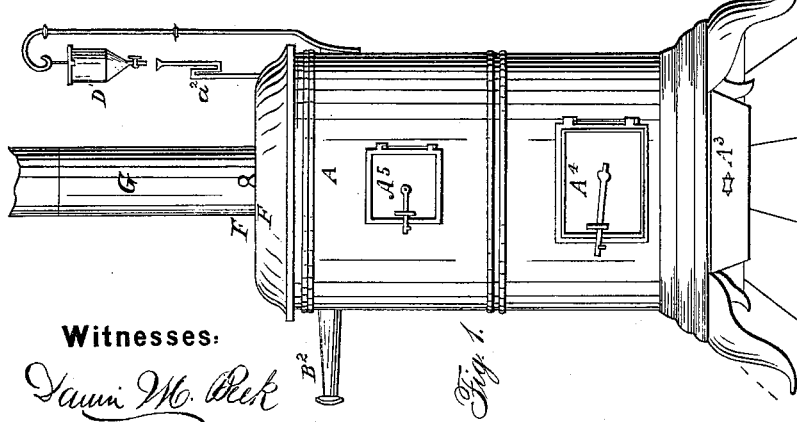
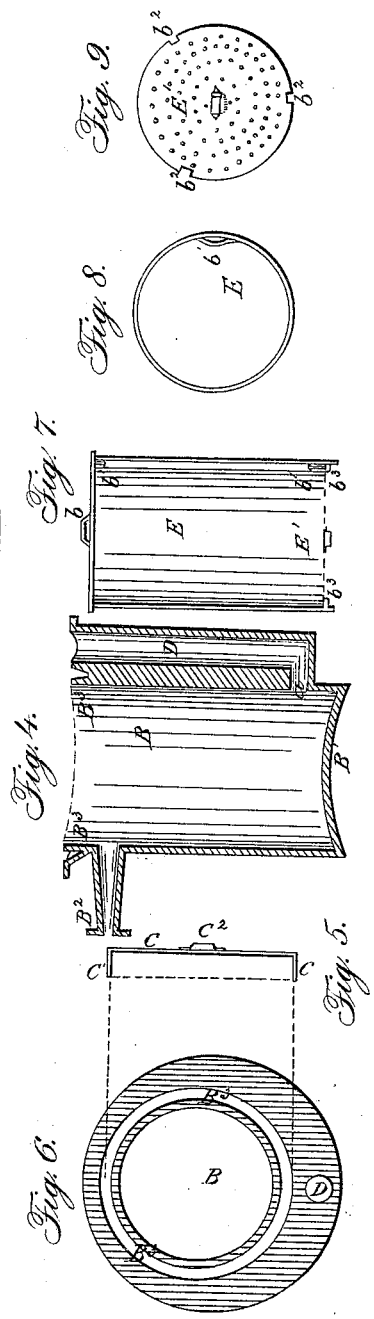
Witnesses:
Inventor:

UNITED STATES PATENT OFFICE.

N. AUBIN, OF ALBANY, NEW YORK.

MAKING ILLUMINATING-GAS.

Specification of Letters Patent No. 14,045, dated January 8, 1856.

*To all whom it may concern:*

Be it known that I, N. AUBIN, of Albany, in the county of Albany and State of New York, have invented certain new and useful Improvements in the Processes of Making Gas for Illumination and other Purposes; and I do hereby declare that the same are described and represented in the following specifications and drawings.

To enable others skilled in the art to make and use my improvements I will proceed to describe the process and the construction and mode of using the apparatus, referring to the drawings, in which the same letters indicate like parts in each of the figures.

The nature of my improvement consists in generating gas for purposes of light and heat from rosin, grease, oil tar, or other such substances rich in hydrogen and carbon, which are in a liquid form or become so on being subjected to heat, by mixing the same with porous or coarsely divided substances, such as charcoal, broken brick, &c., which in themselves contain no gas and are slow conductors of heat, such mixture being introduced into the retort by means of a separate vessel, for the purpose of decomposing it, to facilitate the withdrawal of the contents after the gas is extracted.

Figure 1, is a front elevation of a gas generating apparatus. Fig. 3, is a side view of the same. Fig. 3, is a section of Fig. 1 cut through the center. Fig. 4, is a perpendicular section of the decomposing retort and steam generator. Fig. 5, is a top view of the same; and Fig. 6 is a section of the cover. Fig. 7, is a section of the vessel to contain the materials, from which the gas is to be generated. Fig. 8, is a plan of the same; and Fig. 9 the perforated bottom.

In the above mentioned drawings A, is a furnace of fire bricks, incased if desired by a sheet, or cast iron shell of a cylindrical or other form. A', is the fireplace, $A^2$ is the fire grate, $A^3$ the ash-pit, $A^4$ the door to light the fire and clean the fire-place, $A^5$ the door to throw in coal.

B is the decomposing retort.

It is a vessel which may be made about 18 inches deep, of a cylindrical form when of a small size, and of an oval or oblong form when it is to be of large dimensions.

The bottom B' is arched upward to give it room for expansion without straining the sides too much; and also to support it when very highly heated.

$B^2$ is the neck of the retort to which is connected the pipe for conducting the gas to the cooler, and gas holder.

$B^3$ is a groove or gutter in which is placed an alloy of bismuth, lead, and tin, in such proportions as will insure its fusion at a temperature of about 212° Fahrenheit. To prevent the oxidation of these metals, the alloy is covered with a layer of lamp black, or other such substance. This gutter is of a depth proportionate to the pressure which the gas has to overcome to raise the gas holder, and pass through the hydraulic main.

C is the cover of the retort, the side of which C' dips into the melted metal in the groove $B^3$. This cover is to be of a weight proportioned to its superficial area, so as to overbalance the pressure exerted by the gas. $C^2$ is a handle or projection to raise it conveniently.

D is the steam generator. It is a cylindrical vessel, cast separate from, or attached to the decomposing retort, and connected with it through a passage $a$. It has a cover $a'$, into which is screwed the siphon pipe $a^2$. This steam generator is filled with pieces of fire brick, pumice stone or other such refractory or porous matter, above which is a small vessel, or cup in which the water drops from the siphon pipe $a^2$.

E is an independent vessel made of copper, sheet, or thin cast iron, about an inch smaller in every direction, than the decomposing retort B. It is opened at one end and provided with a handle $b$, fixed to the upper end. On the side of the vessel in the interior, is formed a pipe, $b'$, opening at both ends into the interior of the vessel, one at the top, the other near the lower end. This pipe is placed there to prevent any undue pressure in the upper part of the vessel, which would be caused by vapor generating in that portion of the apparatus, and which if confined there by the rosin or other substance melting and forming with the cooler parts in the center of the vessel a solid body might endanger the apparatus. The lower end of the vessel E is closed by a movable perforated plate E', with three or four notches, $b^2$, corresponding to as many catches, $b^3$, affixed to the side of the vessel E to allow the plate to be passed into it and turned a little, to remain supported by the catches, when the vessel is inverted and put into the decomposing retort: as seen at Fig. 3.

D' is a vessel with a cock, $a^3$, containing water and suspended above the siphon pipe, $a^2$, as shown in the drawing or in any suitable manner.

F is a dome covering the top of the furnace. It has an opening at top, of a diameter sufficient to admit through it the cover C. This opening is closed by a plate or lid F' either independent or turning on a hinge. The dome, F, has another opening on the side, to which is attached a pipe $F^2$ which connects the space covered by the dome, with the smoke-pipe G. By this arrangement any smoke, steam vapor or gas, remaining in the retort, when the cover C is raised, is conveyed to the chimney by the draft of the smoke pipe, and thus prevented from spreading into the room in which the furnace is placed.

The apparatus having been constructed as above described, a fire is made in the grate, and when the bottom of the vessel B is at a dull red heat, coarsely powdered rosin, grease oil, tar or other such hydrocarbon which is in a liquid form or liquefies on being subjected to heat, mixed with coarsely divided charcoal, bricks, or other substances of a similar nature, which are not hydrocarbon and which are slow conductors of heat, in suitable proportions, (the most advantageous being about one part in volume of the rosin or grease &c. to three or four parts of the charcoal or bricks, &c.) is introduced into the vessel E, the perforated bottom E' is put in its place, and the vessel with its contents is introduced in an inverted position into the retort B. The cover C is placed in the groove $B^3$: water is allowed to drop through the cock, $a^3$, and siphon pipe $a^2$, into the steam generator D, and gas is generated and expelled from the retor, and conveyed to a cooler, and gasometer without any further trouble.

When all the gas has been extracted from the matter contained in the vessel E, which occurs in the course of one or two hours, which can be easily ascertained by opening a gage cock attached to the neck $B^2$, or other suitable place: the cover C is raised, the vessel E withdrawn, and another vessel previously prepared in the same manner, is introduced in its place, the cover replaced, and the generating of gas continues as above described. Many advantages are obtained by this new arrangement. In every known gas apparatus, in which gas is generated from rosin, oil, grease, &c., these substances are melted in a separate vessel, from which they are allowed to run into a horizontal retort: this operation requires a constant watching, and causes much waste of the materials used, as a large proportion of the matter used is reduced to vapor, and passes out of the retort undecomposed, and condenses along with the tar, and cannot conveniently be used again, as it is apt to swell or foam and run over the rosin vessel when heated.

With my present arrangement, the apparatus occupies much less room, and requires but little attention, as a new charge can be put into the retort, and this vessel closed in a few seconds. If rosin, grease, or other such substance were introduced at once, and singly into the retort, they would melt at once, and run to the bottom of the retort, and either cool it, or foam, or pass out merely in the state of vapor; while by being mixed with another substance coarsely divided, and conducting heat but slowly, and placed in a vessel perforated at its lower end, as explained above, the rosin, grease, &c., melts slowly, and runs to the bottom gradually, where it is partially or wholly decomposed and vaporized; it then rises outside of the vessel, along the side of the retort where it meets with the highly heated steam, which further decomposes the vapor, and drives the permanent gas quickly out of the retort, thereby preventing the usual deposit of carbon, and consequent clogging of that vessel. The tar which condenses can be very conveniently used again in the apparatus, by mixing it with the same slow conducting substance and a smaller proportion of oil, grease, &c., thus all the gas in the substance used is extracted from it, and the great waste of the present methods avoided.

When the apparatus is of large dimensions, the vessel containing the material to be decomposed would be handled with difficulty; then instead of one alone, two or more smaller vessels are to be put into the retort. The liquid joint described above and formed by a fusible alloy (where mercury or other liquids cannot be used, as they will evaporate at the heat the retort acquires toward the end of the operation,) is also a very great improvement, as all will understand who have had to make a luted joint in the usual manner; as it saves much time trouble and inconvenience from leakage.

What I claim as my invention and improvement in the above described process of making gas, is—

Mixing the materials from which the gas is to be generated, with porous or coarsely divided substances, which are slow conductors of heat, and introducing the mixture into the retort in a vessel with a perforated bottom, so constructed as to compel the contents of the vessel, expelled by the heat to escape at the lower end, near to or in contact with the bottom of the retort, where the heat is the most intense substantially as described.

N. AUBIN.

Witnesses:
 CHS. P. WANNALL,
 J. DENNIS, Jr.